United States Patent Office 3,804,960
Patented Apr. 16, 1974

3,804,960
PREPARATION OF EXTRACT FOR FREEZE DRYING
Stanley Barnett, Pearl River, N.Y., and Tyrone T. Mak, Stamford, Conn., assignors to General Foods Corporation, White Plains, N.Y.
No Drawing. Filed Sept. 26, 1968, Ser. No. 762,993
Int. Cl. A23j 1/08
U.S. Cl. 426—384                                       5 Claims

ABSTRACT OF THE DISCLOSURE

An extract is prepared for freeze drying by concentrating the extract to a solids content of at least 35% by weight of the extract, partially slush freezing the extract, foaming the partially slushed extract and freezing the slushed and foamed extract prior to freeze drying. It has been found that product quality and uniformity are improved by partially slushing prior to foaming.

BACKGROUND OF THE INVENTION

This invention relates to freeze drying of extracts, such as coffee extracts. More particularly, the invention is concerned with the processing of the extract prior to freeze drying including concentration of the extract, slush freezing and foaming, in such a manner that the capacity of the freeze drying system will be increased and the product quality and uniformity will be improved.

When processing extracts such as coffee extract in a freeze drying system, a primary consideration is product quality. This is particularly true in freeze drying as the cost of production in such a system is significantly greater than other competing systems such as spray drying. Because of the relatively high processing costs a second major consideration is improvement of the process to reduce the cost. One approach to the problem has been to concentrate the extract to a higher solids content in order to reduce the amount of water which must be removed from the frozen extract in the freeze drying chambers. In order to insure product quality, freeze concentration has frequently been adopted as the means of concentrating the extract. In the case of coffee, it is not uncommon to concentrate an extract from about 20% to about 35% solids by weight of the extract prior to freezing and freeze drying. Thus, about 50% of the water is effectively removed prior to freeze drying.

A major problem associated with extract concentration prior to freeze drying is that the final density of the dry solids increases as the solids content of the extract prior to drying increases. The higher density is a problem, as the consumer is accustomed to spooning out a particular volume of instant coffee per cup and the same volume of a dense freeze dried coffee would result in an undesirably strong drink.

The density problem has been overcome to some extent by foaming the extract prior to freezing. The basic approach has been to use an apparatus similar to an ice cream freezer wherein the concentrated extract and a gas are introduced into the freezer. The foam which is generated at the inlet of the equipment is subjected to agitation and chilling such that ice crystals are formed and mixed in with the foam. The extract on discharge is a mixture of foam and ice crystals and is commonly referred to as a slush foam. This basic approach has been shown in U.S. Pat. 3,309,779 issued Mar. 21, 1967 to L. F. Ginnette et al. and assigned to FMC Corporation and in Swiss Pat. 1,102,587 which completed specification was published Feb. 7, 1968.

There are several major problems associated with the foam-slush approach. First, the extract is exposed to a gas being bubbled into it, and there is a tendency for the gas to carry off volatile aromatic constituents. The loss of aromatics is particularly troublesome when using an extract which has had aromatic fractions blended in prior to freezing. Second, there is a real control problem, i.e. it is difficult to control the amount of foaming and such control is essential in order to control the final product density. Furthermore, the control problem is intensified as the solids content of the extract is increased, since the degree of foaming and expansion needed to obtain a given final product density increases with increasing concentration.

SUMMARY

It has now been discovered that a slush-foam extract can be prepared in a manner which gives significantly improved control over product density, minimizes the possible loss of aromatics during the foaming operation and yields a slush-foam which when frozen can be successfully freeze dried. The slush-foam is prepared by using a multi-stage slushing operation and introducing the gas for foaming after the initial or soft slush has been formed. In this manner, the gas is introduced into a homogeneous mixture of ice crystals and concentrated extract (this being referred to as slush). The increased viscosity of the soft slush, as compared to the starting extract prior to slushing, tends to minimize any possible loss of aromatics due to the stripping action of the gas being introduced. Furthermore, the ability to control the degree of expansion, and hence the product density, is significantly improved; especially when using highly concentrated extracts having a solids content in excess of 35% by weight of the extract. After the gas is introduced and the foam is formed, the slushing operation may be continued until a hard slush is obtained, e.g. a slush which will retain its shape after extrusion. The hard slush will then be completely frozen in any shape desired for freeze drying. Thus, the slush can be spread onto a flat surface and frozen in the shape of slabs and the slabs freeze dried, or the frozen slabs can be ground and the ground product freeze dried. Alternatively, the hard slush can be shaped into any other desired shape prior to freeze drying.

The term extract as used throughout this application refers to a solution of solids extracted from a natural product in water. Thus, one could have an orange extract which would be a solution of soluble solids from oranges in water. Similarly one could prepare soy extract, cocoa extracts or a multitude of other extracts. Coffee extracts refers to a solution of coffee solids, both naturally soluble and those solubilized by autoclaving, obtained via the normal commercial operation known as percolation. That is, the solids extracted in a multi-stage system of extractors wherein the roasted and ground coffee is contacted with water under heat and pressure, the water flowing from the extractor containing the most spent ground coffee (i.e. most completely extracted) to the extractor containing the freshly charged coffee, and finally a weighed amount of extract (water plus coffee solids) being drawn-off from the fresh column for further processing. The coffee extract thus produced may have a solids content varying from about 18 to 25 percent by weight of the extract.

The term freeze drying refers to the production of dry solids (e.g. at about 3% final moisture) by removal of water from frozen extract via sublimation. The sublimation process is normally carried out in a vacuum chamber wherein the pressure is reduced to below the triple point of water. Heat is introduced to the frozen extract at a controlled rate in order to supply the heat of sublimation while preventing the frozen extract from reaching a temperature at which it would melt, and the sublimed vapors are collected on a refrigerated condenser.

The term slush refers to a mixture of ice crystals and extract. The ice crystals are normally formed in the slushing operation by passing the extract through a refrigerated, scraped surface heat exchanger, water from the extract freezing onto the refrigerated surface, the frozen crystals then being scraped off the surface and completely dispersed in the extract by the action of the scraper blades which also act as agitators. A soft slush refers to a mixture of extract and ice which contains at least 7 to 10% ice by weight of the slush. The slush is considerably more viscous that the initial extract, but is not viscous enough to be extruded into shaped pieces which will retain their shape. A hard slush contains at least 15% ice by weight of the slush and more usually at least 20% ice. A hard slush will not flow freely without mechanical working, and it can be extruded in various shapes and will retain its extruded shape.

DESCRIPTION OF THE PREFERRED EMBODIMENT

Coffee extract as received from a percolator set containing about 18 to 25% soluble solids by weight of the extract is concentrated to obtain an extract with at least 35% solids. The concentration is preferably achieved by freeze concentration wherein ice crystals are formed in the extract and the ice and liquid extract are then separated. The ice crystals are essentially pure water and the remaining extract, which contains most of the original coffee solids, is now a concentrated extract. Freeze concentration is commonly accomplished in a scraped surface heat exchanger by allowing water to freeze against the chilled surface of the heat exchanger, scraping off the crystals of ice and separating the ice crystals and concentrated extract in a centrifuge. Thus, if one were to start with an extract containing 20 parts solids and 80 parts water, to achieve a 35% concentration extract would require that 43 parts of water be frozen and separated. The result would be a concentrated extract having 20 parts of solids and 37 parts water. The 43 parts of water removed represents more than 50% of the initial water to be removed, and thus the water removal load of the freeze drying system is significantly reduced.

If the 35% concentration extract were simply frozen, freeze dried and ground at this point, a screened fraction containing a −20 U.S. mesh +30 U.S. mesh fraction would be found to have a density of about a 0.26 gm./cc. Assuming that a density of 0.18 g./cc. is the desired density for a finished instant coffee product, it is obvious that the processing advantages of freeze concentration would necessarily result in a less desirable final product.

It was found, however, that the extract could be foamed prior to freezing and drying and that the resultant product had a density significantly lower than the unfoamed product. Foaming presented several major difficulties. First, inorder to produce a quality product it was common to blend aromatic constituents into the extract prior to freezing. These aromatic constituents were highly volatile and would tend to be stripped out during the foaming operation. Second, it was necessary to obtain a stable foam with gas bubbles uniformly dispersed throughout the extract and to critically control the degree of expansion. Control over expansion was necessary as the density of the final product varied inversely with the degree of expansion.

Due to the nature of coffee extract, it was found that the degree of expansion could not be readily controlled when simply whipping a gas into the extract, even when the extract temperature was reduced to about 30° F. prior to foaming. It was also found that control over foaming was somewhat improved when the foaming was accompanied by the formation of slush. Thus, if the extract and gas were introduced into a scraped surface heat exchanger and ice crystals were formed on the surface of the heat exchanger, scraped from the surface and blended into the foaming extract, the degree of expansion could be more easily regulated. Also, since the system was essentially a closed system the loss of aromatics was reduced. However, control over the degree expansion was not precise and the size of the gas bubbles tended to vary significantly, such that the density and appearance of the final product was not uniform.

It was then discovered that control over expansion could be significantly improved and loss of aromatics essentially eliminated if the extract were slushed prior to foaming. It was also found that as the amount of ice in the slush increased, the viscosity of the slushed extract changed significantly. Thus, a slush containing about 7 to 10% ice flowed freely, while a slush containing above 20% ice could only be spread by using mechanical spreaders. A slush which flowed freely was referred to as a soft slush, while one which could only be spread mechanically was referred to as a hard slush.

It was found that a hard slush did not foam uniformly or consistently. However, surprisingly, it was discovered that if the soft slush were foamed, the uniformity of gas bubbles in the foam and the control over the degree of expansion were significantly improved. It is theorized that the ice content of the soft slush tends to break up large gas bubbles which may form during the foaming operation, thus accounting for the more uniform gas bubbles. Also, the increased viscosity of the soft slush as compared to the extract and the physical presence of the ice probably reduce the tendency of extract to foam in a random manner and account for the increased control.

Therefore, the extract prior to foaming should be subjected to a slushing operation wherein a slush with at least 7% ice is prepared. Furthermore, it has been found that the degree of control is greatest if the ice content of the slush is increased to the point where the slush is almost a hard slush. Thus, when starting with a 35% concentration extract it has been found that a slush with an ice content of about 13 to 15% is most preferred condition prior to foaming.

The foaming operation can be carried out without any additional ice formation and the foamed slush can then be frozen by any standard technique, e.g. on an endless freezing belt. Alternatively, the foamed slush can be subjected to an additional slushing operation and the ice content increased until a hard slush is obtained. This hard slush can be extruded in different shapes and the shapes subjected to a final freeze prior to freeze drying.

It has been stated that the density of the final product is inversely proportional to the degree of expansion. This is apparent by the results obtained when 35% concentration extract was formed into a soft slush in a "Votator" scraped surface heat exchanger using a refrigerant temperature of about 22° F. in order to obtain a slush containing about 13% ice. The slush was then foamed by whipping nitrogen gas into the slush until a desired degree of expansion was achieved. The foamed samples were spread in a pan, frozen, freeze dried and ground and the density of a −20 mesh +30 mesh fraction were compared. The following results were obtained:

| Sample: | Density in g./cc. |
|---|---|
| No gassification | 0.26 |
| 10% volume increase | 0.24 |
| 20% volume increase | 0.21 |
| 40% volume increase | 0.18 |

Similar results were obtained when using 45% and 60% concentration extracts. Of course, the higher the initial concentration the greater the degree of expansion necessary to obtain a given product density.

When freeze drying the foamed slush, it was found that when the dryer was loaded with an equivalent weight of solids per square foot of drying surface as the unconcentrated extract, capacity of the freeze drying chambers was increased as the drying time of the concentrated, foamed slush was less than that of the initial unconcentrated extract. Also, the water vapor load was significantly reduced due to the use of a concentrated extract.

The following example will illustrate a means for carrying out the method of this invention.

Example

Coffee extract which had been concentrated to a solids content of 35% was chilled in a scraped, jacketed mixing bowl for approximately 20 minutes, using a coolant temperature of 10° F., forming a viscous slush containing about 13% ice by weight at a temperature of 24° F. The bowl was then placed in a nitrogen atmosphere and agitated with a scraper-stirrer whipping gas into the slush. The volume increase due to entrapped air was proportional to the stirring time.

The foamed slush was transferred to ½ inch deep molds maintained at 0° F. for 2 hours without loss of volume and then transferred to a −30° F. room for a final freeze. The ½ inch slabs were then freeze dried in 6 hours as compared to 12 hours for a comparable load of unconcentrated, frozen extract. The bulk density of a −20 mesh +30 mesh fraction of dried product which had been subjected to a 40% volume increase was 0.18 g./cc. compared with 0.26 g./cc. for the unfoamed 35% concentration extract.

Alternatively, the initial slushing operation could be performed in a scraped surface, double pipe heat exchanger such as a "Votator" using a refrigerant temperature of about 22° F. to produce a slush having an ice content of about 13% by weight and the soft slush could then be fed into a second scraped surface heat exchanger along with a controlled amount of gas to cause the extract to foam as it is agitated. The extract may be further slushed in this second heat exchanger by using a refrigerant temperature of about 10° F. and a slush containing about 40% ice by weight could be extruded, cut into desired lengths and freeze dried.

The foregoing example and alternatives were given to illustrate the flexibility possible in processing extract while utilizing the invention herein described. Reference should be had to the appended claims for a definition of the scope of the invention.

We claim:
1. A method for producing a freeze dried coffee product having a controlled density comprising the steps of:
    (a) chilling a coffee extract having a soluble solids content of at least 35% by weight to below the ice point of the extract to form a soft slush containing at least 7% but less than 15% by weight of ice,
    (b) foaming said soft slush by whipping a gas into the slush to produce at least a 40% volume increase,
    (c) subjecting the foamed soft slush to further chilling to form an extrudable hard slush containing at least 20% by weight of ice,
    (d) forming the hard slush into a desired shape,
    (e) freezing the shaped slush to below its eutectic point, and
    (f) freeze drying the frozen, shaped slush.
2. The method of claim 1 wherein the soft slush contains about 13% to 15% by weight of ice.
3. A method for producing a freeze dried coffee product having a controlled density comprising the steps of:
    (a) chilling, in a jacketed, scraped-surface heat exchanger, the coffee extract having a soluble solids content of at least 35% by weight to below the ice point of the extract,
    (b) forming ice crystals by freezing water onto the surface of a jacketed scraped-surface heat exchanger,
    (c) scraping the ice crystals off the wall of the heat exchanger,
    (d) agitating the extract to completely disperse the ice crystals in the extract,
    (e) continuing the freezing, scraping and agitation until a soft slush containing at least 7% but less than 15% by weight of ice is obtained,
    (f) feeding said soft slush into a second scraped-surface heat exchanger along with a controlled amount of gas to cause the slushed extract to foam to at least a 40% volume increase as it is agitated,
    (g) freezing, scraping and agitating in said second heat exchanger until said hard slush contains at least 20% by weight of ice,
    (h) extruding the hard slush into a desired shape,
    (i) freezing the shaped slush to below its eutectic point, and
    (j) freeze drying the frozen shaped slush.
4. The method of claim 3 wherein the soft slush contains about 13% to 15% by weight of ice.
5. The method of claim 4 wherein the gas is nitrogen.

References Cited

UNITED STATES PATENTS

| | | | |
|---|---|---|---|
| 2,976,158 | 3/1961 | Morgan | 99—199 |
| 3,170,803 | 2/1965 | Morgan, Jr. | 99—199 |
| 3,373,042 | 3/1968 | Elerath | 99—71 |
| 3,309,779 | 3/1967 | Ginnette | 99—199 |
| 3,379,538 | 4/1968 | Berry | 99—199 |
| 3,443,963 | 5/1969 | Simon | 99—71 |
| 3,482,990 | 12/1969 | Pfluger | 99—71 |
| 3,495,522 | 2/1970 | Mueller | 99—71 |

WILBUR L. BASCOMB, Jr., Primary Examiner

MARTIN G. MULLEN, Assistant Examiner

U.S. Cl. X.R.

426—385; 34—5; 62—58